United States Patent
Evans et al.

[11] Patent Number: 5,675,555
[45] Date of Patent: Oct. 7, 1997

[54] MULTIPLE SENSOR FISH SURROGATE FOR ACOUSTIC AND HYDRAULIC DATA COLLECTION

[75] Inventors: Jim Evans, Tallulah, La.; Falih Ahmad, Clinton; John M. Nestler, Vicksburg, both of Miss.

[73] Assignee: The United States of America as represented by the Secretary of the Army, Washington, D.C.

[21] Appl. No.: 502,025

[22] Filed: Jul. 13, 1995

[51] Int. Cl.$^6$ ................................................ H04B 1/02
[52] U.S. Cl. ...................................... 367/139; 367/191
[58] Field of Search ......................... 367/139, 135, 367/149, 153, 173, 191; 43/1, 4; 119/174

[56] References Cited

U.S. PATENT DOCUMENTS

| | | | |
|---|---|---|---|
| 4,380,808 | 4/1983 | Hill et al. | 367/153 |
| 4,689,777 | 8/1987 | Roever | 367/153 |
| 4,932,007 | 6/1990 | Suomala | 367/139 |
| 5,177,891 | 1/1993 | Holt | 43/17.1 |
| 5,517,465 | 5/1996 | Nestler et al. | 367/139 |

*Primary Examiner*—Daniel T. Pihulic
*Attorney, Agent, or Firm*—Luther A. Marsh

[57] ABSTRACT

The apparatus of this invention are multiple fish surrogates that each have a plurality of piezoelectric and triaxial accelerometer sensors for emulating sensory organs of a particular fish. The multiple fish surrogates are immersed in flowing water intakes of a hydraulic structure such as: intakes, intake bypasses, and diversion structures; or also natural geological formation such as riffles, shoal areas, and pools. The invention is used for acquisition of acoustic and fluid dynamic data in or near these hydraulic structures and natural formations. To accomplish this, multiple sensors in multiple fish-shaped physical enclosures are deployed at the same time to describe a fish's aquatic environment at locations such as in proximity to a dam's intake. Since such an intake exhibits turbulent and high energy flow fields that cannot be characterized by a single sensor, many sensor bodies are required for a complete characterization of the environment. Similar deployment of the multiple sensor fish bodies can be made in complex natural channels to describe their acoustic fields and hydrodynamic fields. Such data are correlated with fish behavior for the purpose of developing methods of diverting fish from such areas of danger of a water intake or to attract them to a water bypass entrance system.

8 Claims, 2 Drawing Sheets ically, it relates to an apparatus simulating multiple
5,675,555

MULTIPLE SENSOR FISH SURROGATE FOR ACOUSTIC AND HYDRAULIC DATA COLLECTION

STATEMENT OF GOVERNMENT INTEREST

The invention described herein may be manufactured and used by or for the United States Government for governmental purposes without the payment of any royalties thereon.

FIELD OF THE INVENTION

The invention pertains to an apparatus for studying the relationship between hydroacoustic signals/hydraulic pressure variations and fish behavior at water intakes. More specifically, it relates to an apparatus simulating multiple acoustic or flow sensory elements or systems of a specific fish under study to characterize acoustic signals and hydraulic pressure variations for correlation with fish movement towards, or away from, these water intake structures that potentially are zones of danger to these fish. The invention can also be used to describe complex flow patterns in natural aquatic settings or manmade hydraulic structures.

BACKGROUND OF THE INVENTION

Many valuable fish species are in serious decline, requiring human intervention to prevent further decline and extinction. Such intervention includes the use of apparatus and methods for diverting or repelling fish away from zones of danger caused by man made structures, such as the intakes of hydroelectric power turbines, or the intakes of pumping stations used on lakes for off-peak hours that pump water from the low side of the hydroelectric power dam to the upstream reservoir, or the intakes of water diversion structures. Prior art teachings of apparatus intended for underwater acoustic source emanations related to fish includes fish bait lures that use active acoustic sources to catch fish. For example, U.S. Pat. 5,177,891 entitled "Game Fish Attracting Device" by Holt teaches of a game fish luring device that is capable of generating multiple acoustic signatures for attracting a particular fish. Moreover, this teaching discloses well known means of obtaining underwater acoustic signatures using standard underwater acoustic apparatus. However, this teaching does not suggest or teach of either a means or method for recording accurate data that a fish's sensory organs experience at a water inlet.

Previous fish behavioral studies have been based on assumptions that sound field emanations influence a fish's movement and could be represented by mathematical models based on an acoustic field of simple sources such as dipoles and monopoles. Generally, these studies have dealt with only a compressional wave component of a sound field that does not include an actual particle motion component. Such studies do not adequately describe the sound field that influences a fish's behavior, especially in areas of high turbulence. Fish have a very important sensory organ referred to as the lateral line which contains hair cells that transduce mechanical hair motion caused by these types of pressure differences and particle motion experienced at a water inlet into neuroelectrical impulses. The function of this important sensory organ is not taken into account by methods known in the technical arts of environmental studies. Thus, the instant invention's sensory fish surrogate is a means for collecting relevant acoustical/hydraulic data that can assist in the design of a water inlet that will deter fish from such a water inlet. Alternatively, the invention can be used to collect acoustical/hydraulic data to attract fish to the entrances of fish bypass systems.

SUMMARY OF THE INVENTION

The apparatus of this invention are multiple fish surrogates that each have a plurality of piezoelectric and triaxial accelerometer sensors for emulating sensory organs of a particular fish. The multiple fish surrogates are immersed in flowing water intakes of a hydraulic structure such as: intakes, intake bypasses, and diversion structures; or also natural geological formation such as riffles, shoal areas, and pools. The invention is used for data acquisition of acoustic and fluid dynamic data in or near these hydraulic structures and natural formations. To accomplish this, multiple sensors in multiple fish-shaped physical enclosures are deployed at the same time to describe a fish's aquatic environment at locations such as in proximity to a dam's intake. Since such an intake exhibits turbulent and high energy flow fields that cannot be characterized by a single sensor, many sensor bodies are required for a complete characterization of the environment. Similar deployment of the multiple sensor fish bodies can be made in complex natural channels to describe their acoustic fields and hydrodynamic fields. Such data are correlated with fish behavior for the purpose of developing methods of diverting fish from such areas of danger of a water intake or to attract them to a water bypass entrance system.

DETAILED DESCRIPTION OF THE INVENTION

Figure 1A:
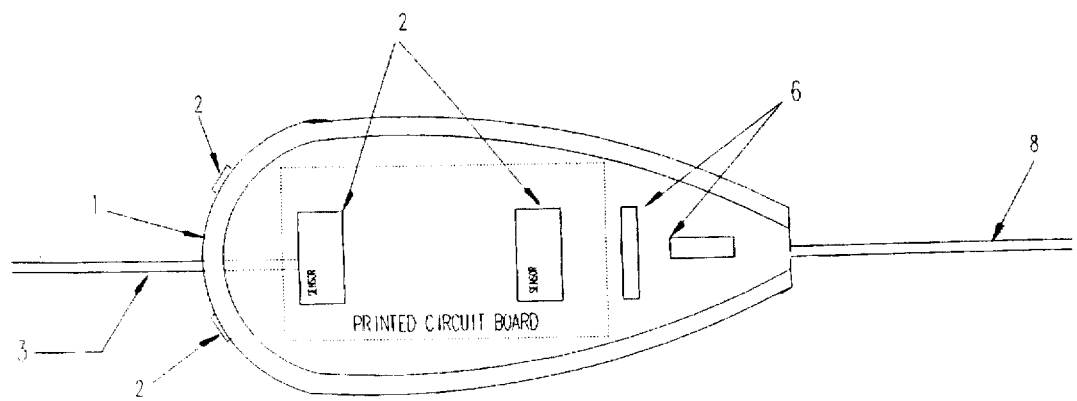
FIG. 1a shows an assembly drawing of the fish surrogate including optical fiber network and stabilizer line.

FIG. 1a is an illustration of a single fish surrogate used in the instant invention. It is similarly shown and described in U.S. patent application Ser No. 08/364,919 entitled "Multiple Sensor Fish Surrogate for Acoustic and Hydraulic Data Collection," now U.S. Pat. No. 5,517,465 which is hereby incorporated by reference. However, the instant invention includes additional triaxial accelerometers (6) within the fish surrogate (10) for determining extra low frequency data (less than 5 Hertz) a fish experiences at a water inlet. Moreover, the fish surrogate as taught in U.S. patent application Ser. No. 08/364,919, now U.S. Pat. No. 5,517,465 is only useful for performing preliminary acoustical studies, not for detailed hydraulic/acoustical studies of a water inlet as provided by the instant invention.

Figure 1B:
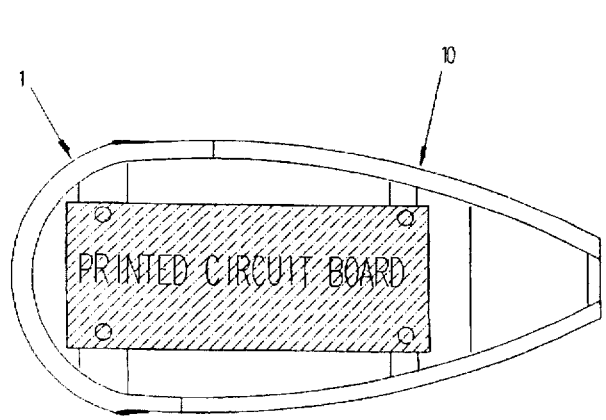
FIG. 1b shows an assembly drawing of the fish surrogates of this invention indicating position of printed circuit board.
Figure 1C:
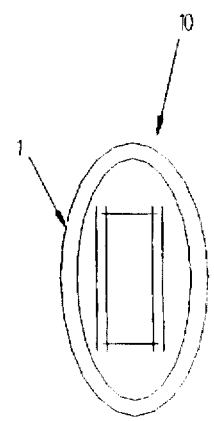
FIG. 1c shows an a cross-sectional view of FIG. 1b.

Each fish surrogate (10) as shown in FIG. 1b comprises a hollow enclosure (1) having an approximate size and shape of the fish under study at a location of particular interest. Fiberglass reinforced epoxy or polyester resins are the preferred materials for constructing the hollow enclosure of the fish surrogate. Other materials may be used provided they seal the fish surrogate's enclosure against water intrusion. A plurality of piezoelectric sensors (2), ranging in numbers are mounted on the exterior surface of the fish surrogate (10) enclosure as shown in FIG. 1b at locations corresponding to sensory areas on an actual fish under study. Each fish has a stabilizer line (8). Thus, several such sensors can be located on areas corresponding to the fish's head. The output signals of these sensors (2) & (6) of FIG. 1a of each fish surrogate (10) pass wires and optical leads through the interior of the surrogate fish (10) enclosure as shown in FIG. 1b, being properly sealed against water leakage. The optical and power leads in turn passes through a water tight connection (3) from the enclosure. These leads are connected to a supporting frame that supports the plurality of fish surrogates (10). These leads form a harness (20) that transmits sensory output data.

Figure 2:
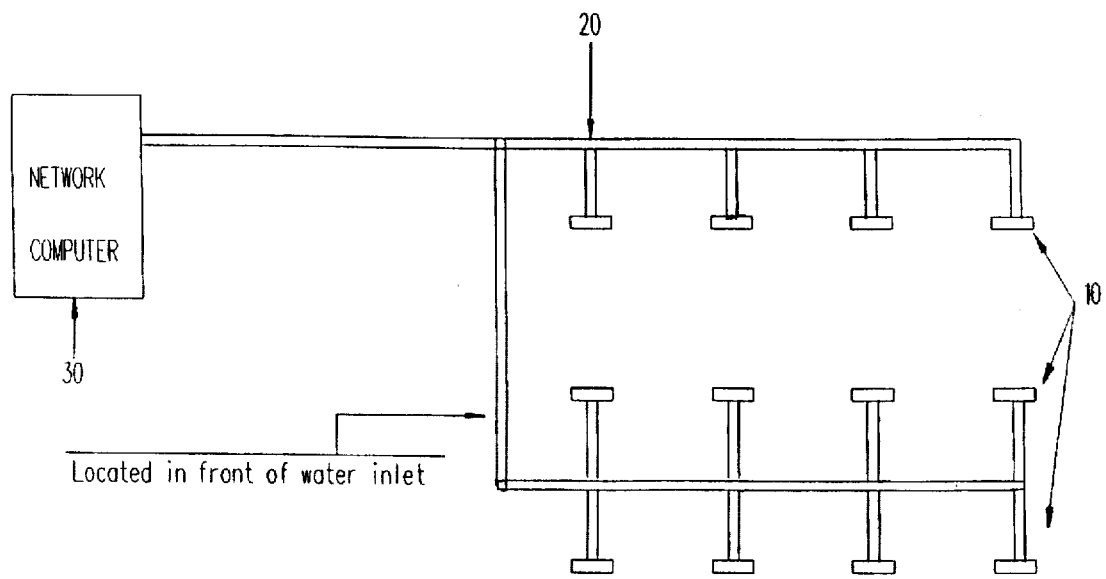
FIG. 2 shows a schematic view of several of the fish surrogates of this invention for deployment at a water intake.
Figure 3:
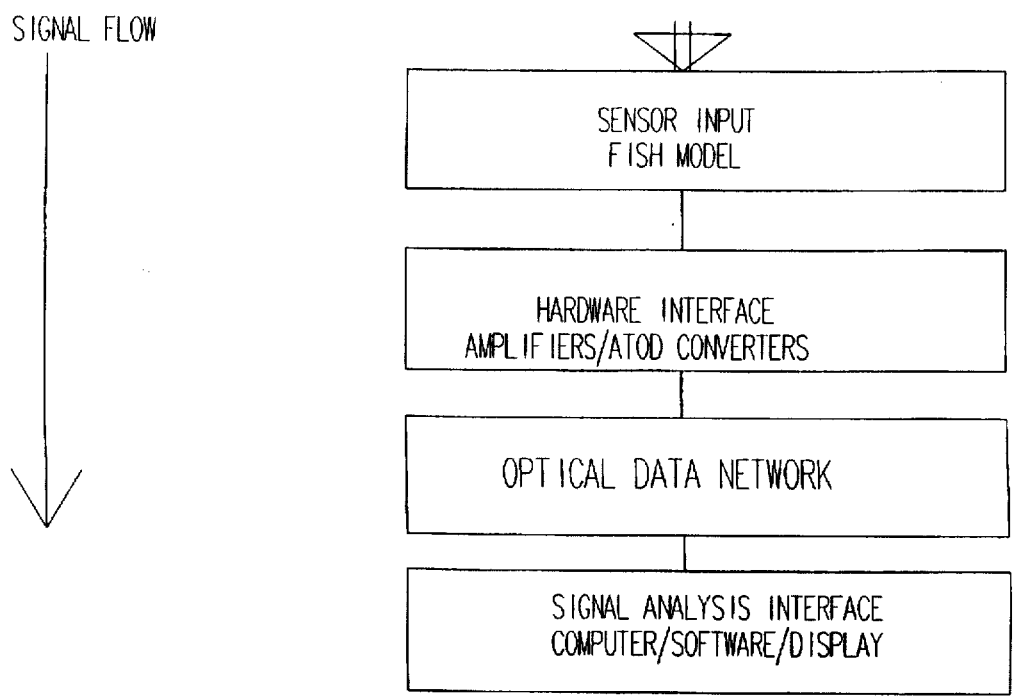
FIG. 3 shows a signal flow block diagram of one of the fish surrogates of this invention.

The signals recorded during test runs, during which the multiple fish surrogates (10) as shown in FIG. 1b are immersed in water, may be analyzed and displayed as needed by central processing unit (30). The system of the instant invention as shown in FIG. 2 and FIG. 3 has multiple fish surrogates (10) that are interconnected to the power & optical fiber harness (20) to the master central processing unit (30). The network allows for high speed data transmissions between the central processing unit (30) and the individual fish surrogate (10). Data can be retrieved from any of the multiple fish surrogates (10), for example, as many as 256 such units, at a rate of several thousand bytes per second. Since many water intake structures are hydroelectric in nature, the preferred data transmission link of the harness (20) is a fiber optic cable which prevents the electromagnetic interference due to the hydroelectric generators which may interfere with data acquired by the system. Power is supplied to the fish sensors using electrical wire.

The instant invention can use an arcnet network. The arcnet network is characterized by a token bus protocol with up to 255 nodes. The network interface provides both network management and Fault isolation. The network further includes a self diagnostic capability where duplicate node ID detection and fault isolation are used. Each data packet may contain up to 512 bytes. Data rates may be from 156 Kbs to 5 Mbs. Data transmissions from the fish surrogates (10) can be accomplished via the fiber optic transmission link that is consist of a star topology.

Typically, the fish surrogate (10) has eight analog channels located within the device. Five of the eight channels are passive by design and the other three have provisions for a 12 volt power source. the system has the capability of performing 16 bit digitization of all input channels. The digitization rate is 100.000 samples per second.

The operation of the system is as follows: The master central processing unit (30) can initiate commands to the fish surrogate (10). Each fish surrogate (10) has a specific identification byte (IDF byte) that will respond to a data request contained in its identification. In addition each sensor in each fish surrogate (10) has a specific identification byte IDS byte which will be forwarded to the master central processing unit (30) from one of the fish surrogates (10). Each fish surrogate (10) has a microcontroller which can decode commands from the master central processing unit (30) and respond according to that command to: i) send a signal from a specific fish and channel; ii) send all signals from the multiple channels from a specific fish surrogate; iii) send signals from a desired channel of selected fish surrogate; and iv) preform diagnostic of an individual surrogate.

In addition to the data, the fish surrogate (10) will also send the fish IDF and sensor IDS, the amplifier gain byte and the data status byte. Once the data is received by the central processing unit. It may be stored on disk or displayed by the central processing unit (30) in real time depending on the request of operator. The fish surrogate (10) has a microcontroller with selectable three decades of amplifier gain. The digitized data are maintained within the center range of the gain range, if the data is outside the center of the gain range the gain is changed to be within the acceptable gain range which is determined by the microcontroller. The data is inspected by the microcontroller continuously after conversion by the analog to digital converter. If the microcontroller cannot find a range where data within a center range gain level, a data corrupt byte is sent along with the data. If the data within an acceptable data range, the corrupt byte is zero. The display output of the system can show an analog representation of digital signals in real-time sequentially. Several channels can be displayed in any sequence on the terminal at one time.

While this invention has been described in terms of a specific preferred embodiment, it is understood that it is capable of further modification and adaptation of the invention following in general the principle of the invention and including such departures from the present disclosure as come within the known or customary practice in the art to which the invention pertains and may be applied to the central features set forth, and fall within the scope of the invention and of the limits of the appended claims.

We claim:

1. An apparatus for characterizing acoustic signals and pressure variations in hydraulic inlet structures in relationship to a fish's behavior at such locations comprising:
   (a) multiple hollow fish surrogate enclosures corresponding in size and shape to the fish under study;
   (b) each surrogate fish has a plurality of piezoelectric sensors mounted on the exterior of the enclosure and a plurality of triaxial accelerometers mounted within;
   (c) each surrogate fish has power and data transmission means connected to an electronic board, that in turn, connect to the sensors for transmitting output signals from the piezoelectric and accelerometer sensors, the power and data transmission means pass through a water-tight connection of each enclosure;
   (d) each surrogate fish has a supporting means affixed to each surrogate enclosure, the supporting means provides a data transmission pathway from each fish surrogate, that in turn, connects to an electronic central processing unit; and
   (e) the electronic central processing unit including a means for recording acoustic signals sensed by each surrogate fish.

2. The apparatus of claim 1 wherein the data transmission means is an optical fiber link.

3. The apparatus of claim 1 wherein the electric board includes a microcontroller which decodes commands from the electronic central processing unit and the microcontroller responds according to a command to: i) send a data signal from a particular sensor from an addressed surrogate fish; ii) send all data signals from the specific fish surrogate; iii) send signals from a desired channel of selected fish surrogate; and iv) preform diagnostic of the specific surrogate fish.

4. The apparatus of claim 2 wherein the data transmission means is a network between the central processing unit and individual fish surrogates is a star network.

5. The apparatus of claim 2 wherein the data transmission means is a network between the central processing unit and individual fish surrogates is an arcnet network.

6. A method for studying the relation between acoustic signals and pressure variations in a water intake and fish behavior at such locations under the study comprising the steps of:
   (a) deploying an array of multiple electronic surrogate fish with acoustic sensors where the surrogate fish is physically modeled in the shape of a fish under study at a hydraulic inlet structure;

(b) performing an underwater acoustic data measurements of the water inlet; and (c) performing analysis of the measurements by a central processing unit and storing processed information, whereby a structural design of the hydraulic inlet can be determined or modified thereby deterring the fish under study away from the inlet.

7. The method of claim 6 wherein the acoustic sensors of each surrogate fish enclosure is a plurality of piezoelectric sensors mounted on the exterior of the enclosure and a plurality of triaxial accelerometers mounted within.

8. The method of claim 6 can be used to characterize the acoustic or hydraulic fields of hydraulic structures or complex features of natural water bodies with or without the body fish geometry.

* * * * *